United States Patent [19]

Moy et al.

[11] Patent Number: 5,521,236

[45] Date of Patent: May 28, 1996

[54] FLAME RETARDED STABILIZED POLYESTER COMPOSITION

[75] Inventors: Paul Y. Moy, Fishkill, N.Y.; Gerald R. Alessio, Emerson, N.J.

[73] Assignee: Akzo Nobel N.V., Arnhem, Netherlands

[21] Appl. No.: 332,664

[22] Filed: Nov. 1, 1994

[51] Int. Cl.[6] .......................... C08K 5/3492; C08K 5/523
[52] U.S. Cl. ........................... 524/101; 524/127; 524/219
[58] Field of Search ..................................... 524/101, 127, 524/219

[56] References Cited

U.S. PATENT DOCUMENTS

| | | | |
|---|---|---|---|
| 4,303,579 | 12/1981 | Jackson | 260/45.95 E |
| 4,464,496 | 8/1984 | Nemzek et al. | 524/91 |
| 4,722,955 | 2/1988 | Dick | 524/109 |
| 4,859,732 | 8/1989 | Minnick | 524/385 |
| 4,892,901 | 1/1990 | Liu | 524/303 |
| 4,983,654 | 1/1991 | Cheung et al. | 524/100 |
| 5,021,495 | 6/1991 | Minnick | 524/410 |
| 5,032,631 | 7/1991 | Golder et al. | 524/101 |
| 5,135,973 | 8/1992 | Fukasawa et al. | 524/127 |
| 5,250,616 | 10/1993 | Asay et al. | 524/84 |
| 5,254,610 | 10/1993 | Small, Jr. et al. | 524/120 |
| 5,284,903 | 2/1994 | Minnick | 524/538 |
| 5,364,895 | 11/1994 | Stevenson et al. | 524/120 |

Primary Examiner—Kriellion S. Morgan
Attorney, Agent, or Firm—Richard P. Fennelly; Louis A. Morris

[57] ABSTRACT

Flame retarded and stabilized polyester composition contain: (a) a polyester resin derived from a cyclohexanemethanol and a carbocyclic acid; (b) a polyphosphate containing a bridging unit between the phosphate moieties therein which is derived from an arylene-containing diol; and (c) a stabilizer which is either:

(i) a combination of a hindered phenol-substituted isocyanurate and an epichlorohydrin-bisphenol A reaction product; or (ii) a combination of an ester of a hindered phenol and oxidized polyethylene; when the arylene-containing diol is a monoarylene-containing diol, such as resorcinol or hydroquinone; or (iii) a hindered phenol-substituted isocyanurate; or (iv) a phenolic oxamide antioxidant; or (v) combination of a hindered phenol-substituted isocyanurate and an epichlorohydrin-bisphenol A reaction product; or (vi) combination of an ester of a hindered phenol and oxidized polyethylene;

when the arylene-containing diol is a biarylene-containing diol with an alkylene bridging group between the two arylene groups, such as bisphenol A.

7 Claims, No Drawings

FLAME RETARDED STABILIZED POLYESTER COMPOSITION

BACKGROUND OF THE INVENTION

Thermoplastic resins are used extensively as the material of choice for designing complex injection molded articles due to their malleability when molten (after exposure to heat). However, prolonged or excessive exposure to these heat regimes often cause the polymer to become unstable, compromising their mechanical properties or shortening their useful life cycle. This effect becomes more exaggerated as the processing temperatures and/or pressures are increased to force these polymers into thin-walled or narrow cavities.

An example of this is a flame retarded (with an aryl phosphate) thermoplastic polyester, poly(cyclohexylene dimethylene) terephthalate (PCT). Normal processing for this resin can easily reach temperatures of 275°–300° C. However extended processing periods can cause the composite to become unstable and ultimately compromise its effectiveness in a given application.

SUMMARY OF THE INVENTION

The present invention relates to a flame retarded and stabilized polyester composition which comprises: (a) a polyester resin derived from a cyclohexanemethanol and a carbocyclic acid; (b) a polyphosphate containing a bridging unit between the phosphate moieties therein which is derived from an arylene-containing diol; and (c) a novel stabilizer system which is either:

(i) combination of a hindered phenol-substituted isocyanurate and an epichlorohydrin-bisphenol A reaction product; or (ii) combination of an ester of a hindered phenol and oxidized polyethylene; or when the arylene-containing diol is a monoarylene-containing diol, such as resorcinol or hydroquinone; or (iii) a hindered phenol-substituted isocyanurate; or (iv) a phenolic oxamide antioxidant; or (v) combination of a hindered phenol-substituted isocyanurate and an epichlorohydrin-bisphenol A reaction product; or (vi) combination of an ester of a hindered phenol and oxidized polyethylene;

when the arylene-containing diol is a biarylene-containing diol with an alkylene bridging group between the two arylene groups, such as bisphenol A.

DESCRIPTION OF PREFERRED EMBODIMENTS

The polyester resin which is derived from a cyclohexanemethanol and a carbocyclic acid and which forms the predominant component of the overall polyester resin composition of the present invention is known to persons of ordinary skill in the art. A further description can be found in U.S. Pat. No. 5,284,903 to M. G. Minnick at Col.4, line 64 to Col. 5, line 66, which is incorporated herein by reference. A preferred resin of this type is poly(1,4-cyclohexanedimethanol terephthalate) or "PCT" which is commercially available. It constitutes from about 70% to about 95%, by weight of the present composition.

The polyphosphate flame retardant additive which contains a bridging unit between the phosphate moieties therein which is derived from an arylene-containing diol, has the general formula

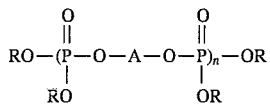

where R is either unsubstituted or substituted aryl, A is a bridging group containing one arylene ring or two arylene rings joined by an alkylene bridging group, and n ranges from 2 to about 10. In the foregoing formula A can be monoarylene, such as would be derived from resorcinol or hydroquinone, or biarylene with an alkylene bridging group between the two aryl rings, such as derived from bisphenol A. In the case of mixtures of such polyphosphates, the value of n in the formula will usually be a decimal value within the above numerical range. Such polyphosphates can, for example, be "bis" phosphates, where "n" in the formula is 1, or oligomeric phosphates, where "n" is 2 or higher. Mixtures of such polyphosphates can be used. In the composition of the present invention, such polyphosphates can be present at from about 1% to about 25%, by weight of the entire composition.

As indicated before, under the Summary of the Invention section, the type of diol selected for the polyphosphate will dictate the type of stabilizer(s) to use in the subject polyester composition. It has been found that either (i) a combination of a hindered phenol-substituted isocyanurate and an epichlorohydrin-bisphenol A reaction product; or (ii) a combination of an ester of a hindered phenol and oxidized polyethylene needed to be employed when the selected arylene-containing diol is a monoarylene-containing diol, such as resorcinol or hydroquinone. Such combinations are also useful when the arylene-containing diol is a biarylene-containing diol containing an alkylene bridging group between the two arylene groups, such as bisphenol A.

The terminology "hindered phenol-substituted isocyanurate" used in defining one of the components of combination (i) or (v) is intended to cover that class of stabilizer which contains an isocyanurate nucleus which is substituted with multiple (e.g., three) hindered phenol substituents. A representative and preferred stabilizer of this type is tris(3,5-di-t-butyl-4-hydroxybenzyl) isocyanurate, which is commercially available under the trademark Irganox 3114 from Ciba Geigy.

The epichlorohydrin-bisphenol A reaction product, which forms the other component of combination (i) or (v) is a well-known class of resins which are available under the trademark Epon, such as Epon 828, from Shell.

The terminology "ester of a hindered phenol", as used to define one of the components of the other combination, combination (ii) or (vi), used with monoarylene-containing diols selected for making the polyphosphate, is intended to cover compounds based on a hindered phenol nucleus (a phenolic structure flanked by two ortho sterically hindering groups, such as t-butyl) which contains an ester substituent, such as —$CH_2CH_2C(O)OR$, where R can be long chain alkyl, such as $C_{16}$–$C_{18}$. A preferred stabilizer of this type is octadecyl 3,5-di-t-butyl-4-hydroxyhydrocinnamate, which is commercially available as Irganox 1076 from Ciba Geigy.

The oxidized polyethylene component in combination (ii) or (vi) is a well known class of stabilizer as well and can be a homopolymer such as is commercially available under the trademark AC-629a from Allied Signal.

The stabilizer used in component (iii) is the same hindered phenol-substituted isocyanurate previously described for combinations (i) or (v).

The terminology "phenolic oxamide antioxidant", as used to describe the stabilizer for (iv) is to be construed as covering stabilizers of the formula

where A is a hindered phenol group (a phenolic structure flanked by two ortho sterically hindering groups, such as t-butyl) and R' is lower alkylene, such as ethylene. A preferred, commercially available stabilizer of this type is 2,2'-oxamidobis[ethyl 3-(3,5-t-butyl-4-hydroxyphenyl)propionate], which is available under the trademark Naugard XL-1 from Uniroyal.

Generally speaking, any of stabilizer choices (i) through (vi) are used at from about 0.05% to about 5%, by weight of the overall polyester composition. In those cases where the stabilizer that is used is a combination of individual stabilizer compounds, the weight ratio of each can range from about 5:1 to about 1:5.

The polyester resin compositions of the present invention can contain other functional additives including reinforcing additives (e.g., fiber glass, carbon fiber, graphite, etc.), mineral fillers (e.g., mica, calcium carbonate, etc.), other stabilizers (e.g., the alkali metal and alkaline earth metal phosphates, etc.), other flame retardants (e.g., halogenated and phosphorus containing compounds, etc.), and the like.

The present invention is further illustrated by the Examples which follow.

EXAMPLES 1–21

To prepare the compounds, a Haake System 90 rheometer with a mixer bowl attachment was initially used, incorporating all the additives in the heated bowl ($\approx$275° C.), blending until homogenized. This method proved to be very difficult due to the high temperatures and long processing times necessary to incorporate the additives (thermal analyses of these composites compared well with later samples, but had more data scattering). Initial stability (TGA/DSC) testing with calcium phosphate (tribasic) and several ionomers (calcium and zinc) were of mixed success.

Subsequently, we prepared extruded samples of two aryl phosphate flame retardants, FYROLFLEX™ RDP and bisphenol A diphenyl phosphate each to a five percent (by weight) level in the resin. Also two percent of $Ca_{10}(OH)_2(PO_4)_6$ was compounded into these masterbatch formulations at the same time. The pelletized composites were dried (about 80° C.) overnight in a vacuum oven. The antioxidants were melt blended in the bowl mixer (275°–280° C.), and samples drawn from the bowl after approximately five minutes of compounding (Table 1).

TABLE 1

Formulations for FR-PCT Stabilized Composites

| Materials: | #1 | #2 | #3 | #4 | #5 | #6 | #7 | #8 | #9 | #10 |
|---|---|---|---|---|---|---|---|---|---|---|
| PCT/RDP *(5%) | 99 | 99 | 99 | 99 | 99 | 99 | 97 | 97 | 97 | 97 |
| Irganox 1076 | 1 | — | — | — | — | — | 1 | 1 | 1 | — |
| Irganox 1010 | — | 1 | — | — | — | — | — | — | — | — |
| Ethyl 330 | — | — | 1 | — | — | — | — | — | — | — |
| Irganox 3114 | — | — | — | 1 | — | — | — | 1 | — | 1 |
| Naugard XL1 | — | — | — | — | 1 | — | — | — | — | — |
| Santowhite | — | — | — | — | — | 1 | — | — | — | — |
| Epon 828 | — | — | — | — | — | — | 2 | 2 | — | — |
| AC 629A | — | — | — | — | — | — | — | — | 2 | 2 |

| Materials: | #11 | #12 | #13 | #14 | #15 | #16 | #17 | #18 | #19 | #20 | #21 |
|---|---|---|---|---|---|---|---|---|---|---|---|
| PCT/BPA *(5%) | 99 | 99 | 99 | 99 | 99 | 97 | 97 | 97 | 97 | — | 100 |
| Irganox 1076 | 1 | — | — | — | — | 1 | — | 1 | — | — | — |
| Irganox 1010 | — | 1 | — | — | — | — | — | — | — | — | — |
| Ethyl 330 | — | — | 1 | — | — | — | — | — | — | — | — |
| Irganox 3114 | — | — | — | 1 | — | — | 1 | — | 1 | — | — |
| Naugard XL1 | — | — | — | — | 1 | — | — | — | — | — | — |
| Epon 828 | — | — | — | — | — | 2 | 2 | — | — | — | — |
| AC 629a | — | — | — | — | — | — | — | 2 | 2 | — | — |
| PCT/RDP (5%) | — | — | — | — | — | — | — | — | — | 100 | — |

*All composites used in Examples 1–21 also contained about 2% calcium phosphate (tribasic), Aldrich, as an additional stabilizer.

Irganox 1076: octadecyl 3,5-di-t-butyl-4-hydroxyhydrocinnamate (Ciba Geigy)

Irganox 1010: tetrakis[methylene(3,5-di-t-butyl-4-hydroxyhydrocinnamate)] (Ciba Geigy)

Ethyl 330: 1,3,5-trimethyl-2,4,6-tris(3,5-di-t-butyl-4-hydroxybenzyl)benzene (Ethyl)

Irganox 3114: tris(3,5-di-t-butyl-4-hydroxybenzyl)isocyanurate (Ciba Geigy)

Naugard XL-1: 2,2'-oxamidobis[ethyl 3-(3,5-t-butyl-4-hydroxyphenyl)propionate] (Uniroyal)

Santowhite: 4,4'-butyldibenebis(6-t-butyl-m-cresol) (Monsanto)

Epon 828: bisphenol A-epichlorohydrin reaction product (Shell)

AC 629a: Oxidized homopolymer polyethylene (Allied Signal)

TGA/DSC thermograms of the materials containing the components on Table 1 were evaluated under nitrogen with a 20° C./minute heat rate and the following results were achieved:

TABLE 2

TGA/DSC Analysis of Stabilized PCT/BisPhosphate Composites

| Composite: | Antioxidant(s) | TGA Onset Wt. Loss (°C.) | DSC Endo. (°C.) |
|---|---|---|---|
| PCT/RDP* | | | |
| −1 | Irganox 1076 | 367 | 279 |
| −2 | Irganox 1010 | 373 | 282 |
| −3 | Ethyl 330 | 373 | 280 |
| −4 | Irganox 3114 | 375 | 281 |
| −5 | Naugard XL-1 | 376 | 281 |
| −6 | Santowhite | 364 | 280 |
| −7 | Irganox 1076/Epon 828 | 376 | 279 |
| −8 | Irganox 3114/Epon 828 | 401 | 279 |
| −9 | Irganox 1076/AC-629a | 392 | 281 |

TABLE 2-continued

TGA/DSC Analysis of Stabilized PCT/BisPhosphate Composites

| Composite: | Antioxidant(s) | TGA Onset Wt. Loss (°C.) | DSC Endo. (°C.) |
|---|---|---|---|
| −10 PCT/BPA* | Irganox 3114/AC-629a | 375 | 282 |
| 11 | Irganox 1076 | 374 | 277 |
| −12 | Irganox 1010 | 379 | 284 |
| −13 | Ethyl 330 | 375 | 282 |
| −14 | Irganox 3114 | 399 | 285 |
| −15 | Naugard XL-1 | 404 | 279 |
| −16 | Irganox 1076/Epon 828 | 379 | 280 |
| −17 | Irganox 3114/Epon 828 | 404 | 277 |
| −18 | Irganox 1076/AC-629a | 395 | 281 |
| −19 PCT/RDP | Irganox 3114/AC-629a | 375 | 279 |
| 20 PCT/BPA | NONE/Control | 365 | 281 |
| 21 | NONE/Control | 371 | 281 |

*All composites contain ≈ 2% calcium phosphate (tribasic), Aldrich. The results given in the above Table were extrapolated values.

These thermograms have shown the efficacy of specific stabilizer blends in the PCT/bis-phosphate blends. Several systems, which are in accordance with the present invention, appeared to be more effective than others: RDP composite Nos. 8 and 9 and BPA composite Nos. 14, 15, 17, and 18. Within this study, the tris(3,5-di-t-butyl-4-hydroxybenzyl)isocyanurate stabilizer (Irganox 3114 brand from Ciba Geigy), and combinations containing it, appeared to be very effective. Several of these aforementioned stabilized PCT composites exhibit enhanced thermal stability of thirty degree celsius or more over neat RDP (365° C.) or BPA (371° C.).

To further examine these systems, isotherm TGA on selected formulations of these materials were performed. An isotherm TGA temperature of 340° C. was determined to be the testing criteria and time of comparative weight loss to 10, 20 and 30 percent would be measured of these composites. The results were as follows:

TABLE 3

TGA Isothermal Analysis (340° C.) of PCT/Bis-Phosphate Composites

| PCT Composites: | Time to Percent Weight Loss (Minutes): | | |
|---|---|---|---|
| | 10% | 20% | 30% |
| PCT/RDP (Control) #20 | 16 | 20 | 24 |
| 3114/Epon 828 (1.0/2.0%) #8 | 25 | 39 | 50 |
| 1076/AC-629a (1.0/2.0%) #9 | 16 | 19 | 23 |
| PCT/BPA (Control) #21 | 19 | 25 | 31 |
| Naugard XL-1 (1.0%) #15 | 25 | 32 | 38 |
| 3114/Epon 828 (1.0/2.0%) #17 | 29 | 40 | 50 |

These thermograms confirm the effectiveness of these antioxidant blends and show roughly twice the residence times for equivalent weight losses.

The foregoing Examples should not be construed in a limiting sense since they are intended to merely illustrate certain embodiments of the present invention. The scope of protection sought is set forth in the claims which follow.

We claim:

1. A flame retarded and stabilized polyester composition which comprises: (a) a polyester resin derived from a cyclohexanemethanol and a carbocyclic acid; (b) a polyphosphate containing a bridging unit between the phosphate moieties therein which is derived from an arylene-containing diol; and (c) a stabilizer which is selected from the group consisting of:

(i) combination of a hindered phenol-substituted isocyanurate and an epichlorohydrin-bisphenol A reaction product;

(ii) combination of an ester of a hindered phenol and oxidized polyethylene;

when the arylene-containing diol is a monoarylene-containing diol; and (iii) a hindered phenol-substituted isocyanurate; and (iv) a phenolic oxamide antioxidant; and (v) combination of a hindered phenol-substituted isocyanurate and an epichlorohydrin-bisphenol A reaction product; and (vi) combination of an ester of a hindered phenol and oxidized polyethylene;

when the arylene-containing diol is a biarylene-containing diol with an alkylene bridging group between the two arylene groups.

2. A composition as claimed in claim 1 wherein (i) is a combination of tris(3,5-di-t-butyl-4-hydroxybenzyl)isocyanurate and bisphenol A/epoxy resin.

3. A composition as claimed in claim 1 wherein (ii) is a combination of oxidized homopolymer polyethylene and octadecyl 3,5-di-t-butyl-4-hydroxyhydrocinnamate.

4. A composition as claimed in claim 1 wherein (iii) is tris(3,5-di-t-butyl-4-hydroxybenzyl)isocyanurate.

5. A composition as claimed in claim 1 wherein (iv) is 2,2'-oxamidobis[ethyl 3-(3,5-t-butyl-4-hydroxyphenyl)propionate].

6. A composition as claimed in claim 1 wherein (v) is a combination of tris(3,5-di-t-butyl-4-hydroxybenzyl)isocyanurate and bisphenol A/epoxy resin.

7. A composition as claimed in claim 1 wherein (vi) is a combination of oxidized homopolymer polyethylene and octadecyl 3,5-di-t-butyl-4-hydroxyhydrocinnamate.

* * * * *